United States Patent [19]

Collins et al.

[11] 4,134,520

[45] Jan. 16, 1979

[54] ARTICLE DISPENSING MACHINE WITH SPRING-DRIVEN CARRIAGES FOR ADVANCING ARTICLES TO BE DISPENSED

[75] Inventors: Robert J. Collins, Venice; Richard R. Stutsman, North Hollywood; Theodore C. Youngkin, Mount Baldy, all of Calif.

[73] Assignee: Rod Pierce & Associates, Marina del Rey, Calif.

[21] Appl. No.: 762,113

[22] Filed: Jan. 24, 1977

[51] Int. Cl.[2] .............................................. B65G 35/04

[52] U.S. Cl. .................................... 221/129; 221/198; 221/227

[58] Field of Search ............... 221/125, 227, 232, 279, 221/198, 129, 281, 226, 230, 231, 151, 225; 312/61, 71; 211/49 S

[56] References Cited

U.S. PATENT DOCUMENTS

| | | | |
|---|---|---|---|
| 2,784,872 | 3/1957 | Lux | 221/230 X |
| 2,893,596 | 7/1959 | Gabrielsen | 221/227 X |
| 3,166,195 | 1/1965 | Taber | 211/49 S |
| 3,282,466 | 11/1966 | Meresz et al. | 221/198 |
| 4,043,483 | 8/1977 | Gore et al. | 221/232 X |

*Primary Examiner*—Stanley H. Tollberg

[57] ABSTRACT

A dispensing machine in which a carriage moves articles along a horizontal trough toward a releasing mechanism by which the articles are dispensed one at a time. The carriage is driven by a tape spring that forms a coil when unrestrained, the coiled portion of the spring being mounted on the carriage with the uncoiled portion extending along the trough to the releasing mechanism. The force exerted on the carriage by the tape spring remains substantially constant regardless of the number of articles in the trough and the corresponding position of the carriage. The trough is open along the top so that articles can be inserted between the carriage and the releasing mechanism in any order desired. A plurality of such troughs are mounted on drawers that can be withdrawn from a cabinet for loading from above.

29 Claims, 14 Drawing Figures

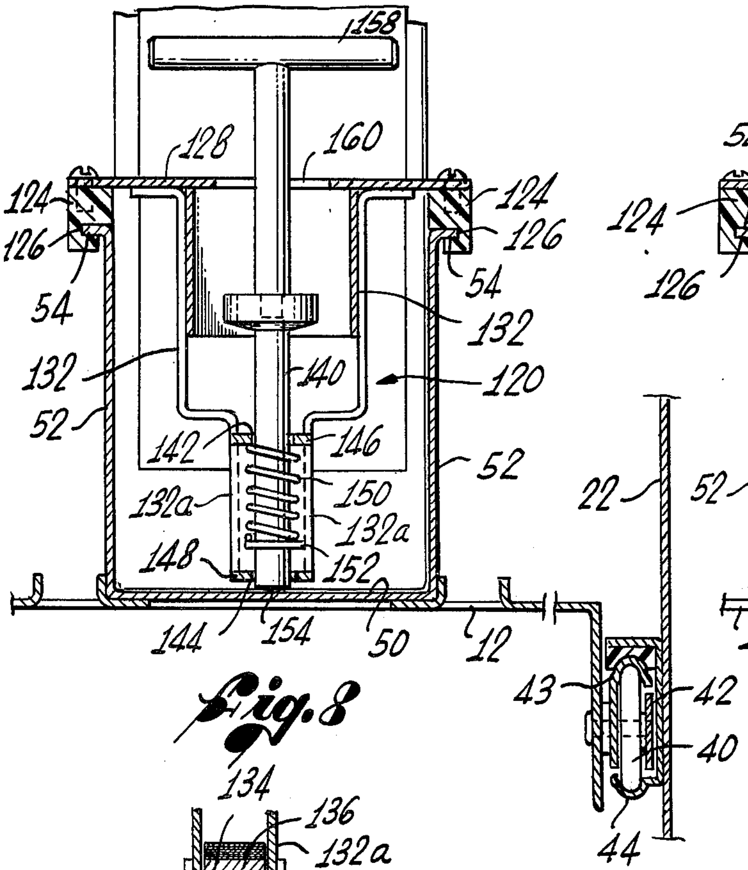
Fig. 8
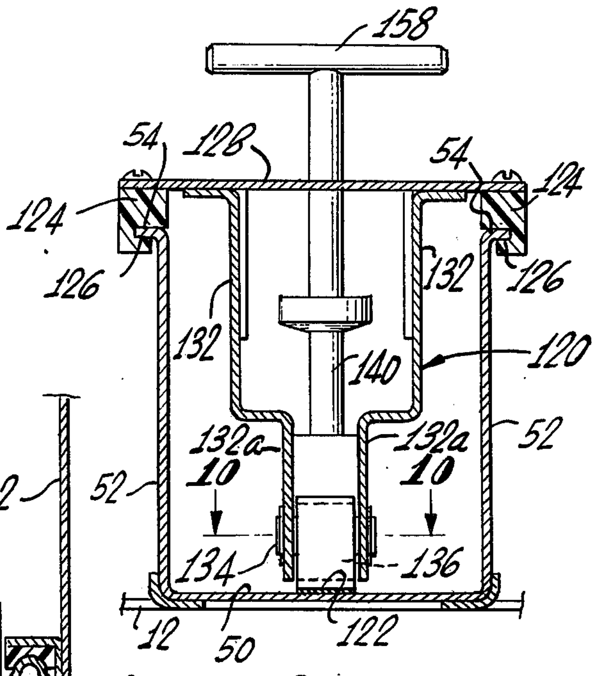
Fig. 9
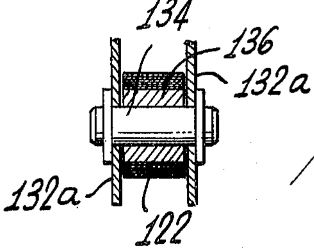
Fig. 10
Fig. 11
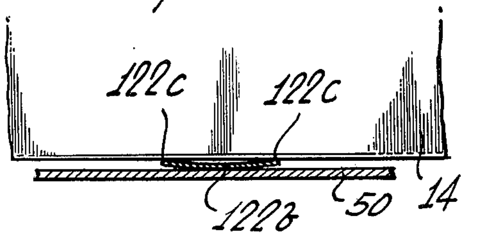
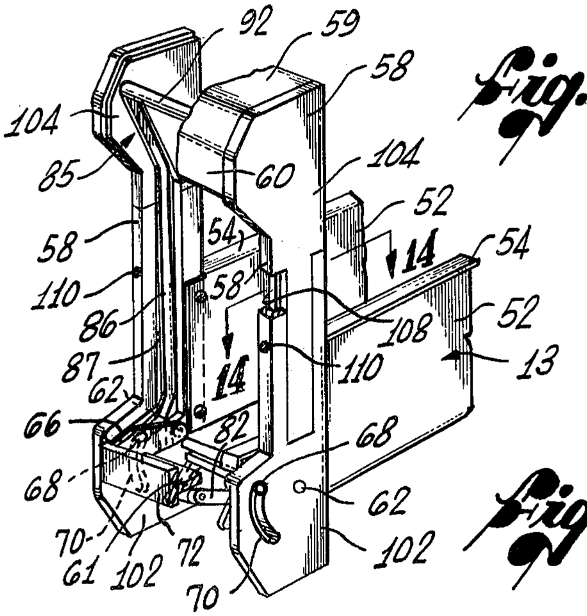
Fig. 12
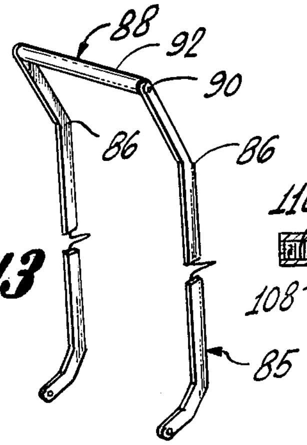
Fig. 13
Fig. 14
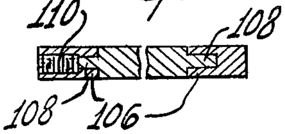

ARTICLE DISPENSING MACHINE WITH SPRING-DRIVEN CARRIAGES FOR ADVANCING ARTICLES TO BE DISPENSED

BACKGROUND OF THE INVENTION

The present invention relates to dispensing machines, and more particularly to a machine that can be actuated to dispense articles one at a time.

A variety of article dispensing machines are known, particularly in the form of vending machines commonly used to dispense cigarettes, food products, soap, novelties and the like. These machines are most often of the gravity feed type in which the articles are stacked in columns within vertical or inclined slots and a releasing mechanism selectively allows articles at the bottom to be dispensed when actuated by a solenoid or mechanical linkage. In the case of a vending machine, there is a provision for disabling the releasing mechanism until a predetermined quantity of coins has been inserted.

Dispensing machines are often used at widely scattered locations, where route men reload them and collect the money that has been deposited. Other such machines are grouped together in stores, where they are used in preference to conventional counter displays because they prevent theft and reduce the need for sales clerks, although this latter use has been less common.

However they may be deployed, dispensing machines should maximize the quantity of product stored in relation to the size of the machine to make optimum use of the available area and minimize the frequency with which reloading is necessary. Many presently known gravity feed machines utilize a relatively small portion of their total volume for the storage of products, and the inclined or vertical arrangement of the slots sometimes limits the variety of products that can be dispensed by a relatively tall machine that takes up a minimum of floor space. Another drawback of conventional gravity machines is that they often do not permit the article being dispensed to be viewed directly, and therefore require relatively complex provisions for signaling when the supply of an item has been exhausted. Moreover, purchasers may be reluctant to use a vending machine if they cannot view the particular article to be dispensed.

Some efforts to improve upon gravity feed dispensing machines have led to arrangements in which the articles to be dispensed are moved horizontally toward dispensing positions by conveyor belts. While these belt-type machines may permit the user to view the article to be dispensed, they are generally complex and often contain a relatively small amount of product in relation to their size.

Other previously known machines have arranged the articles to be dispensed in stationary horizontal troughs. The articles are inserted in the troughs from the front, pushing back a movable wall or bumper and thereby compressing a spring that feeds the articles toward the front of the trough as they are dispensed. In other such machines, springs have been attached at the front of the trough to pull the wall forward as the articles are dispensed. Regardless of which spring arrangement is used, if the articles are both loaded and dispensed from the front of the trough, an article placed in the machine first will remain there until the trough is completely empty. Where the freshness of the articles is important, as in the case of cigarettes or food products, it is particularly desirable that the articles inserted first be dispensed first, and the first-in - last-out arrangement of the front loading machines is unsatisfactory.

Another important disadvantage of previously known spring feed dispensing machines is that the spring force feeding the articles varies inversely with the number of articles remaining in the machine. If the spring is strong enough to smoothly feed articles to a releasing mechanism at the front of the trough when the machine is nearly empty, then it tends to crush the articles when almost full. The crushed articles are not only subject to possible damages, but due to their reduced width, are sometimes dispensed two at a time instead of one at a time when the machine is actuated.

The principal objectives of the present invention are to provide a dispensing machine of simple and relatively trouble free construction in which the articles to be dispensed are arranged in horizontal or substantially horizontal rows, and the articles are loaded in such a manner that they can be dispensed in the order in which they are inserted. Another principal objective is to provide such a machine in which the spring force by which articles are dispensed remains substantially constant regardless of the extent to which the machine is loaded.

SUMMARY OF THE INVENTION

The present invention resides in a dispensing machine including at least one substantially horizontal trough in which the articles to be dispensed are arranged in a row, and a movable carriage pushes the articles along the trough toward a releasing mechanism that dispenses them one by one as it is actuated. The carriage is resiliently urged toward the releasing mechanism by a spring in the form of an elongated resilient metal tape which forms a coil when unrestrained. The tape is attached to the carriage at one end and the front of the trough at the other end. The spring force exerted on the carriage remains substantially constant regardless of the position of the carriage, thereby avoiding jamming of the machine or crushing of the articles to be dispensed due to varying spring forces.

In a preferred embodiment of the invention, movement of the carriage is restrained and retarded by a brake, which may be a plunger that is spring biased to frictionally engage the floor of the trough. The plunger can be used to latch the carriage in a position at the back end of the trough to facilitate reloading.

Troughs of the above construction are contained in drawers slidably received in a cabinet and movable into an open position to facilitate loading. The troughs are open at the top so that new articles can be inserted behind previously loaded articles and those articles that are loaded first are dispensed first.

Other features and advantages of the present invention will become apparent from the following detailed description, taken in conjunction with the accompanying drawings which illustrate, by way of example, the principles of the invention.

BRIEF DESCRIPTION OF THE DRAWINGS

FIG. 8 is an enlarged cross-sectional front view of the trough taken along the line 8—8 of FIG. 5 and showing a brake mechanism and part of the associated drawer and cabinet structure;

FIG. 9 is an enlarged cross-sectional rear view of the trough taken along the line 9—9 of FIG. 5 and also showing the brake mechanism;

FIG. 10 is an enlarged fragmentary cross-sectional top view of the coiled drive spring of the dispensing machine taken along the line 10—10 of FIG. 9;

FIG. 11 is a further enlarged fragmentary cross-sectional view showing an article to be dispensed resting on a drive spring of the machine;

FIG. 12 is an enlarged fragmentary perspective view showing the releasing mechanism of the machine;

FIG. 13 is an enlarged perspective view of an ejector mechanism that is part of the releasing mechanism;

FIG. 14 is an enlarged fragmentary cross-sectional top view of one side of the releasing mechanism taken along the line 14—14 of FIG. 12.

DESCRIPTION OF THE PREFERRED EMBODIMENT

Figure 1:
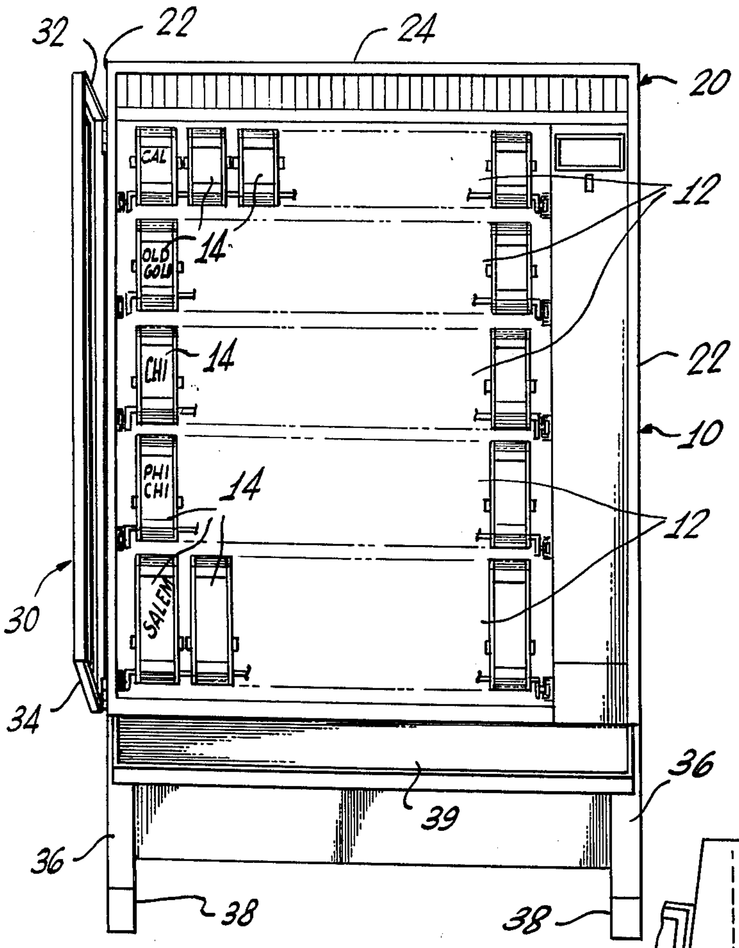
FIG. 1 is a front view of a dispensing machine constructed in accordance with the invention, shown with the door of the cabinet open to expose the dispensing mechanism.

Shown in the drawings for purposes of illustration is a dispensing machine in which articles to be dispensed are moved horizontally toward the front of the machine where they are released one at a time. In general, the dispensing machine includes a metal cabinet 10 of conventional construction which houses drawers 12 that are stacked one above the other, each drawer 12 containing a plurality of parallel horizontal troughs 13 positioned side-by-side and extending from front to back. The articles 14 to be dispensed are arranged in the troughs, one behind the other, in rows and moved along the troughs toward the front of the drawers where they are released as explained more fully below.

Figure 2:
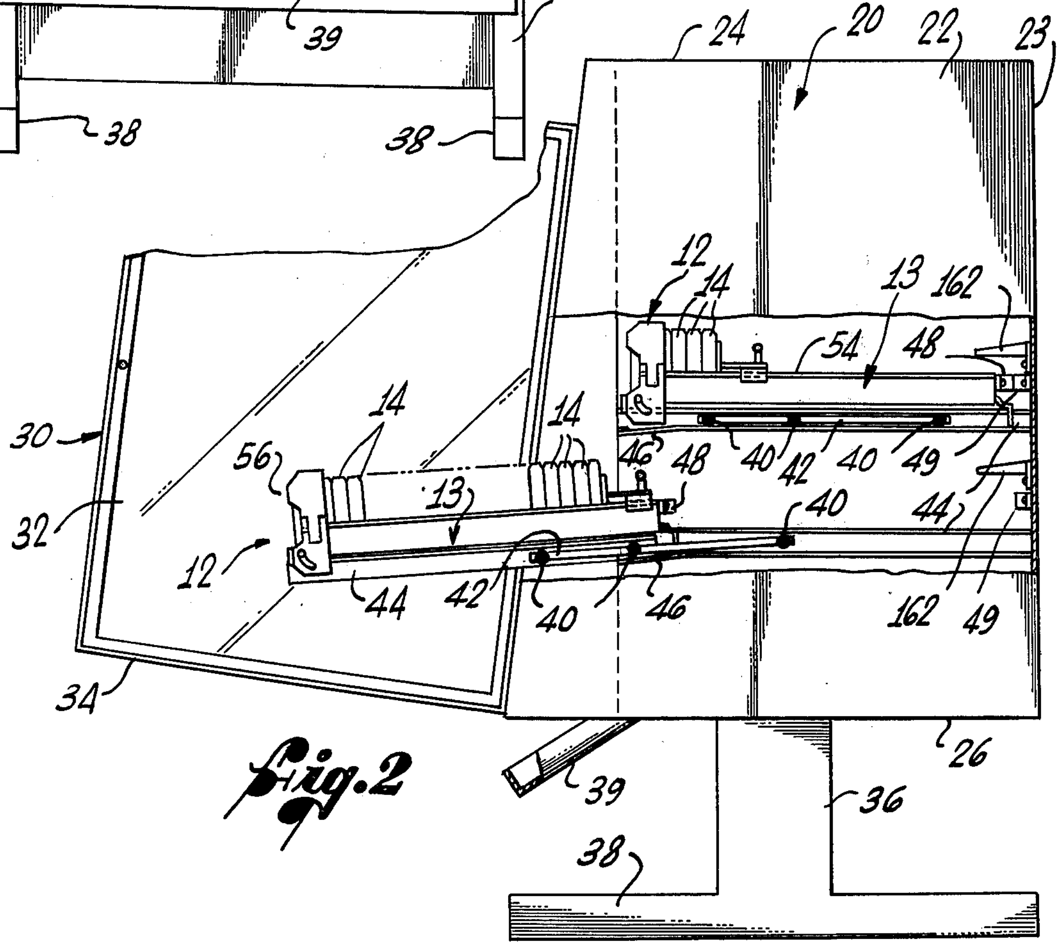
FIG. 2 is a side view of the dispensing machine partially broken away to expose two drawers, one of which is shown in an open or loading position.
Figure 3:
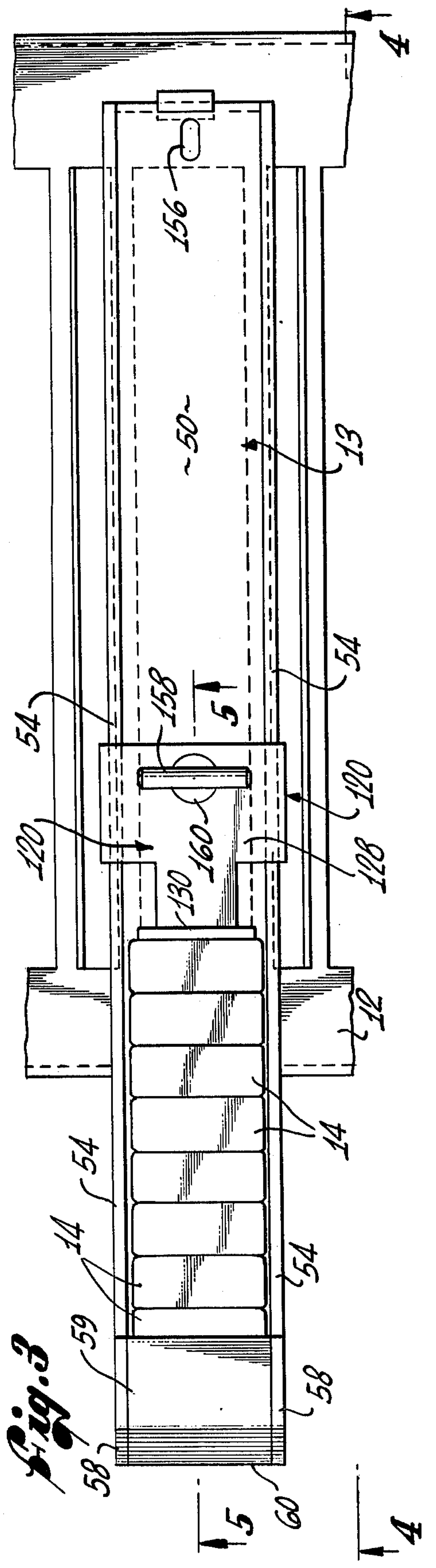
FIGS. 3 and 4 are enlarged top and side views, respectively, of a single article carrying trough of the machine, FIG. 4 being partially broken away to expose a portion of the cabinet at the rear.

Although a wide variety of articles 14 such as food products, drinks, soap, tape cassettes, and novelties can be dispensed according to the invention, packages of cigarettes are used here by way of example. The cabinet 10, as shown in FIGS. 1 and 2, is a generally rectangular boxlike structure having two vertical sides 22, a vertical back wall 23, and a horizontal top 24 and bottom 26. An openable transparent glass or plastic door 30 on the front of the cabinet is hinged to the left-hand sidewall and inclined slightly from the vertical so that in the closed position its top edge 32 is set back from its leading bottom edge 34. The cabinet 10 is supported at either side by vertical columns 36 that project upwardly from a flat base 38. A tray 39 extends along the front of the cabinet beneath the closed door to catch the articles as they are dispensed.

Each of the drawers 12 rides on rollers 40 that are mounted on flat metal rods 42. As shown in FIG. 8, the drawers have horizontal guides 43 on either side forming downwardly facing grooves of U-shaped cross section that engage the rollers from above, and the rollers in turn ride on upwardly facing grooves of similar U-shaped cross section formed by tracks 44 on the sidewall 22 of the cabinet 10. The rods, guides and tracks move telescopically in a conventional manner so that the drawers can slide from a fully closed operative position to a fully extended loading position. A forward portion 46 of each track is inclined slightly from the horizontal so that the drawer 12 tips downwardly in the loading position for more convenient access. Resilient bumpers 48 on the back of each drawer engage similar bumpers 49 on the back wall 23 of the cabinet to limit the travel of the drawers when they are moved to their operating positions, as can be seen in the broken-away portion of FIG. 4.

Each elongated, generally rectangular article carrying trough 13 is mounted on a drawer 12 so that it extends from the back wall 23 of the cabinet 10 toward the door 30. The trough is a sheet metal member of U-shaped cross section, with a flat floor 50, upstanding sidewalls 52, and narrow outwardly bent guide flanges 54 along the upper edges of the sidewalls. The top of the trough 13 is completely open from front to back so that the articles 14 can easily be inserted.

At the front end of the trough 13, nearest the cabinet door 32, is a releasing mechanism 56 (FIG. 12) for dispensing the articles 14 one at a time. The releasing mechanism includes a box-like plastic frame (FIG. 12) about half again as tall as the trough having vertical sides 58, a horizontal top 59, and a cowl 60 extending downwardly from the top. The forward extremities of the trough sidewalls 52 have their flanges 54 removed, so as to be received nicely inside the sides 58 and suitably fastened thereto.

Figure 7:
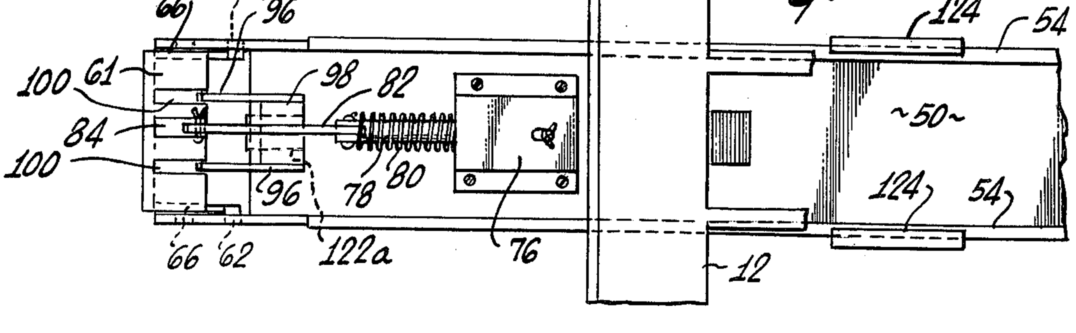
FIG. 7 is an enlarged fragmentary bottom view of the trough.

The bottom of the releasing means 56 is a trap-door 61 mounted on pivot pins 62 projecting outwardly therefrom and received in openings in the sides 58 near the front end of the trough 13, as shown in FIG. 7. The trap-door has short upstanding end walls 66 on its sides which carry outwardly projecting guide pins 68 received in arcuate slots 70 in the sides 58 of the frame, the radius of curvature of each slot extending from the corresponding pivot pin 62.

In its normal closed position (FIG. 5), the trap-door 61 forms a horizontal extension of the trough floor 50 so that the articles 14 can move smoothly and without hindrance from the trough 13 into the releasing mechanism 56. The articles are prevented from moving out through the front of the releasing mechanism 56 by the cowl 60 and an upstanding lip 72 that extends along the front edge of the trap door 61.

Figure 5:
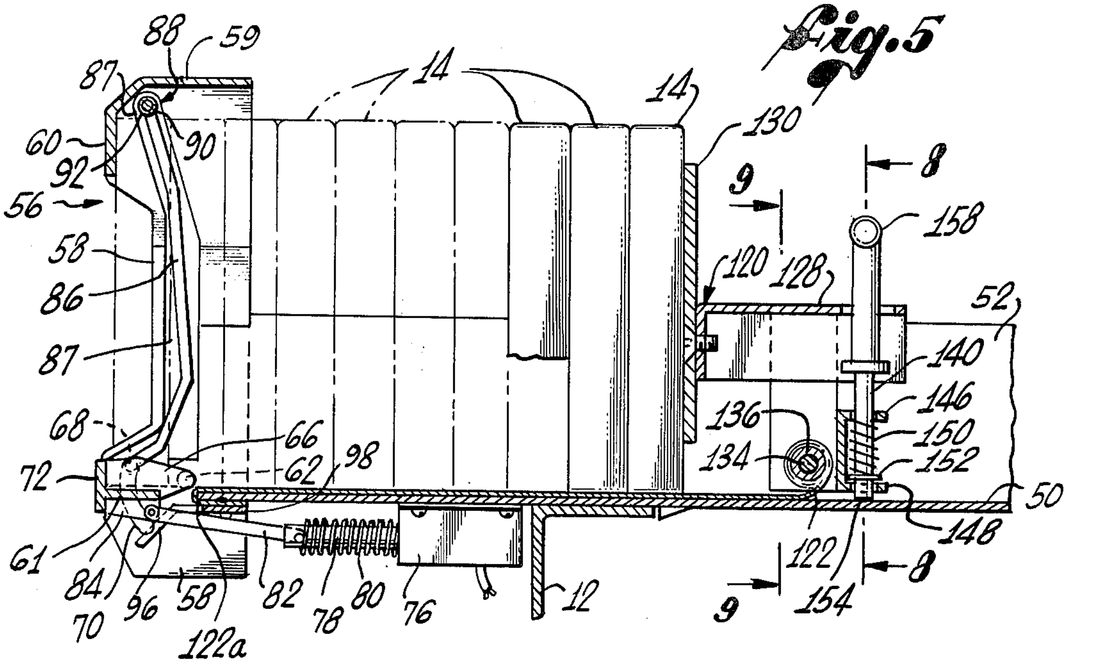
FIGS. 5 and 6 are enlarged fragmentary cross-sectional side views of the trough showing the releasing means in its closed and open positions, and taken substantially along the lines 4—4 and 5—5 of FIG. 3, respectively.
Figure 6:
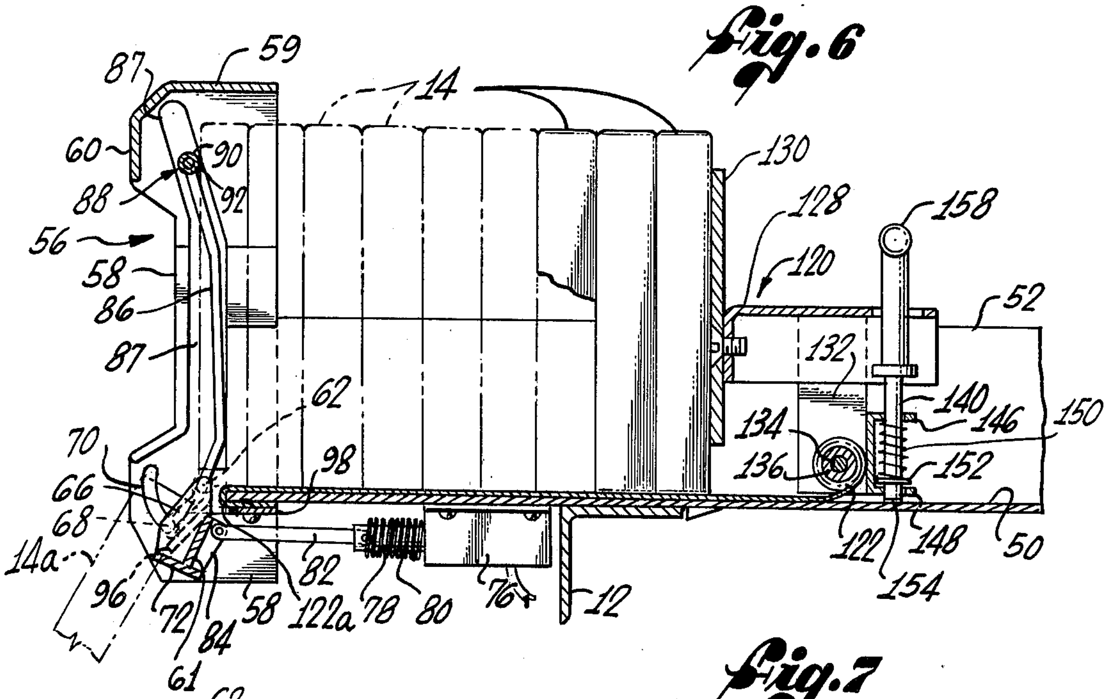

When an article 14 is to be dispensed, the trap-door 61 is pivoted into an open position, in which it is inclined downwardly from the front edge of the trough floor 50 by energizing a solenoid 76, shown in FIGS. 5 - 7, mounted on the underside of the trough 13. In the case of a vending machine, the appropriate energizing circuitry (not shown) may be responsive to the deposit of coins in the conventional manner. The solenoid includes a plunger 78 normally biased by a coil spring 80 toward a forwardly extending position and connected by a link 82 to a projection 84 on the underside of the trap-door 61. Upon energization of the solenoid, the plunger is withdrawn moving backwardly along the longitudinal center axis of the trough. The link in turn causes the trap-door to pivot about the pins 62 into its downwardly inclined open position, allowing the leading article 14 to move out from under the cowl 60 and over the lip 72.

The releasing mechanism 56 also includes an ejector bail 85 (FIG. 13), that provides for positive ejection of the dispensed articles 14. The bail includes two thin, flat, generally vertical, side pieces 86 pivotably attached at their lower ends to the trap-door 61 near its forward swingable end. The side pieces 86 extend upwardly along shallow grooves 87 sunk in the opposing inside surfaces of the sides 58. Both the side pieces and the grooves are generally C-shaped having a vertical center section and being slightly forwardly inclined at the top and bottom. The grooves are substantially wider than the side pieces to permit the necessary movement. At their top ends, the side pieces are connected by a horizontal ejecting member 88 formed by a shaft 90 on which an elongated anti-friction roller 92 is freely rotatable. The extremities of the shaft are loosely journaled in small circular openings in the top ends of the side pieces. As the trap-door 61 moves to its open position, the ejecting member 88 is pulled downwardly by the side pieces 86 so that the roller 92 engages the top of the leading article 14 and pushes it downwardly.

As the article 14 drops, it is deflected outwardly and away from the front edge of the trap-door 61 (FIG. 6) by a pair of guide fingers 96 connected by a bridge piece 98 and attached to the underside of the trough 13 (FIG. 7). The guide fingers 96 extend downwardly from the front edge of the bottom of the trough 13 at an angle of approximately 45 degrees and the trap-door is provided with slots 100 that allow the fingers to pass through the door as it pivots.

So that the machine can be adapted to dispense packages of various heights, each side 58 of the releasing means 56 is formed by two interlocked, vertically telescoping members 102 and 104 shown in cross section in FIG. 12. The lower member 102 is bifurcated and provided with two opposing slots 106 that slidably receive outwardly extending vertical flanges 108 on the upper member 104. The lower member is provided with a set screw 110 that clamps the flange 108 to anchor the upper member in a fixed vertical position. When the height of the releasing means 56 is to be changed it is, of course, necessary to remove and replace the side pieces 86 of the ejector bails 85.

Since the troughs 13 that contain the articles 14 to be dispensed are oriented horizontally, the force of gravity does not advance the articles along the troughs, and it is necessary to provide a feed mechanism for urging them toward the releasing mechanism 56. In the present invention, this feed mechanism is simple and requires very little space but is nevertheless reliable, relatively jam free, and can be latched in an inoperative position when the machine is being loaded. Other advantages of the feed mechanism are that it guides the articles smoothly along the troughs with a minimum of friction and does not interfere with loading of the troughs from the top.

There is a separate feed mechanism for each trough 13 comprising a carriage 120 that moves along the trough pushing the articles 14 before it and a spring 122 that drives the carriage. The movement of the carriage is guided by two slides 124 having inwardly facing grooves 126 that slidably receive the outwardly projecting guide flanges 54 on the top edges of the trough sidewalls 52, as shown in FIGS. 8 and 9. The sides project downwardly from a top plate 128 that also carries a vertical pusher plate 130 transversely oriented with respect to the trough to engage the last article from behind and urge it toward the releasing mechanism 56.

To support the spring 122, the carriage 120 includes two side members 132 that extend downwardly from the top plate 124 parallel to the sidewalls 52 of the trough 13. The lower half of each side member is offset inwardly toward the longitudinal center axis of the trough, and the lower portions 132a of the side members are joined by a horizontal pin 134 that extends transversely with respect to the trough 13. A rotatable spring drum 136 is mounted on the pin.

The spring 122 itself is a resilient metal, preferably steel, tape of the general type often used as a retractable tape measure, that is predisposed to form a coil when unrestrained. The end of the tape 122 about which it coils is secured to the drum 136 and the opposite end 122a is folded over the front edge of the trough 13 and secured to the underside of the trough floor 50 at a point centered between the trough sidewalls 52 and adjacent the releasing mechanism 56. As the carriage 120 is pushed along the trough away from the releasing mechanism, the spring uncoils along the longitudinal center axis of the trough floor and constantly urges the carriage back toward the releasing mechanism. Since the carriage is pulled by a single spring that is centrally located on the trough, any tendency of the carriage to turn to one side and become wedged is minimized.

A unique feature of the feed assembly of the invention is that the spring force driving the carriage 120 toward the releasing mechanism 56 is substantially uniform regardless of the position of the carriage along the trough 13. A more conventional spring arrangement would exert a force proportionate to the distance between the carriage and the releasing mechanism and this greatly varying spring force would tend to jam the releasing mechanism when the carriage was in an extreme position at either end of the trough. Moreover, the high spring force when the carriage was withdrawn to the rear of the trough might crush the articles 14 and could cause the articles to be released two at a time.

As a refinement of the invention, the tape spring 122 is concave in cross section, as shown in FIG. 11, so that its longitudinal center axis 122b rests on the floor 50 of the trough 13 and its edges 122c are slightly raised above the floor. The articles 14 ride on the edges of the tape to reduce friction and further reduce any tendency to jam.

The carriage 120 also incorporates a brake mechanism which retards its movement under the force of the spring 122 with resulting smooth operation of the releasing means 56. The brakes take the form of a vertically oriented plunger 140 that projects through apertures 142 and 144 in two spaced-apart horizontal plates 146 and 148 that extend rearwardly from the side members 132 of the carriage. A compression spring 150 encircles the plunger 140 pressing resiliently against the underside of the top plate 146 and the top side of a circumferential flange 152, thereby forcing the plunger downwardly so that a plastic brake pad 154 on its lower end frictionally engages trough floor 50. The plunger 140 is centered between the trough sidewalls 52 and rides along a path at the longitudinal center of the trough as the carriage 120 is displaced by the force of the tape spring. Since static friction is less than kinetic friction, the brake mechanism causes the carriage to hesitate slightly before advancing after an article 14 has been dispensed, thereby permitting any misaligned articles to settle into the trough 13 and assume their proper position. If it were not for the hesitation introduced by the brake mechanism, soft articles in particular could be suspended between the adjacent articles in a position in which they could override the lip 72, thus resulting in a double release. Moreover, the use of a brake permits a heavier tape spring that produces a more predictable motion of the carriage.

Figure 4:
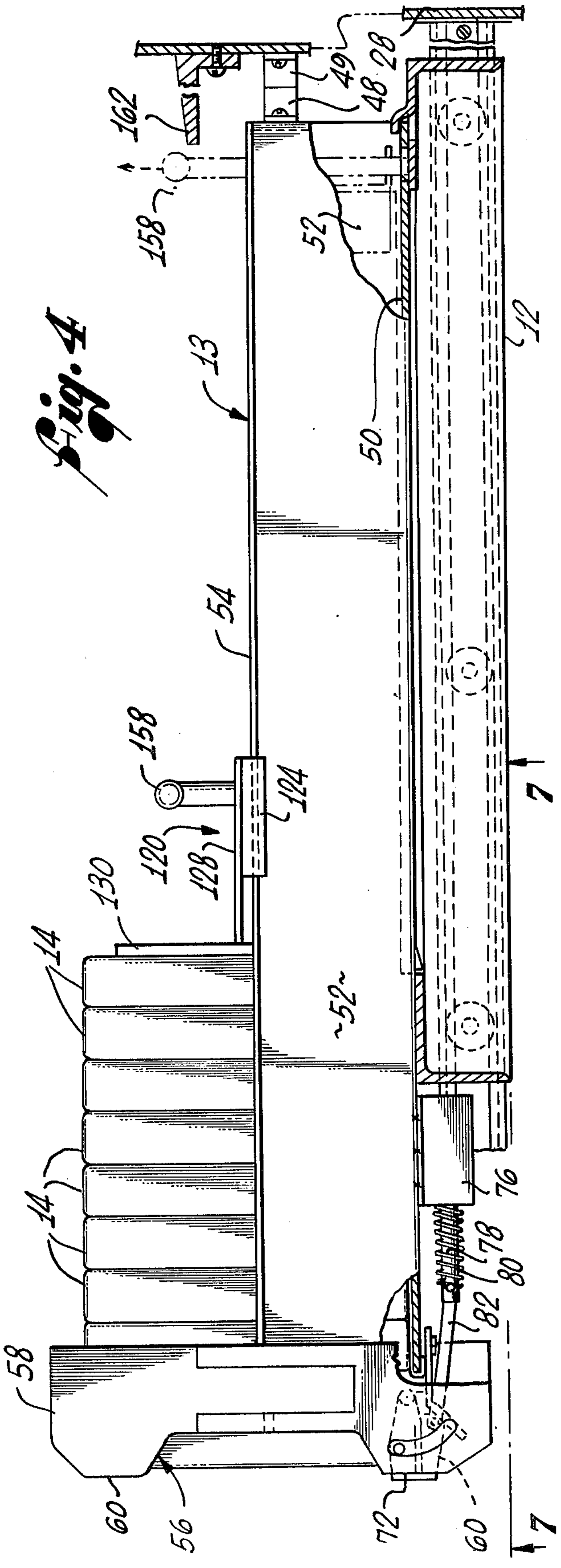

The brake mechanism of the invention also serves as a latch for holding the carriage 120 at the rear of the trough 13 against the force of the tape spring 122 when the machine is being loaded. To enable the brake mechanism to perform this latching function, an elongated latching aperture 156 is provided in the center of the trough floor 50 at the back of the trough, as shown in FIG. 4. To latch the carriage, it is simply moved backwardly along the trough until the lower end of the brake plunger 140 drops into the aperture, thereby preventing the carriage from returning under the force of the spring. The plunger can be disengaged from the aperture 156 by pulling upwardly on the cross piece of a T-shaped handle 158 attached to the top of the plunger that projects through an opening 160 in the carriage top plate 124.

As an added convenience, the carriages 120 can be unlatched by a pair of generally horizontally releasing fingers 162 that project forwardly from the back wall 23 of the cabinet 20. The top surfaces of the fingers form cams that slope upwardly toward the rear of the trough so that the cross piece of the handle 158 is engaged from beneath and forced upwardly to lift the plunger 140 out of its latching position when the carriage is simply pushed back further against the force of the spring 122 and the plunger moves to the rear of the aperture 156.

It will be appreciated from the foregoing that the invention provides a relatively trouble free dispensing machine in which the articles 14 to be dispensed are moved horizontally along troughs 13 by a substantially constant spring force and the proportion of the space consumed by the machine that is available for storage of merchandise is relatively high. The troughs are readily accessible for loading since they are arranged on movable drawers 12, and it is not necessary to manually oppose the force of the spring 122 when loading, due to the latching feature of the brake mechanism. Since the troughs 13 are loaded from the top, new articles can be added behind those already in place so that the articles inserted first will be dispensed first.

While a particular form of the invention has been illustrated and described, it will be apparent that various modifications can be made without departing from the spirit and scope of the invention.

We claim:

1. A dispensing machine comprising:

a frame forming at least one elongated substantially horizontal channel along which articles to be dispensed can be arranged in a row;

releasing means disposed at one end of said frame for releasing said articles sequentially upon actuation thereof;

carriage means movable along said channel for advancing said articles toward said releasing means; and spring means for urging said carriage means toward said releasing means with a substantially constant spring force, said spring means comprising an elongated tape, concave in cross section, and oriented so that the longitudinal center axis thereof rests on the bottom of said trough when uncoiled and the longitudinal edges thereof stand away from the bottom of said trough, whereby said articles to be dispensed rest on said longitudinal edges.

2. The dispensing machine of claim 1, wherein said channel is an open top trough having a floor and two sidewalls, said tape extending along said floor when uncoiled so that said articles rest on said tape.

3. The dispensing machine of claim 1, wherein said spring means is substantially centered in said channel.

4. The dispensing machine of claim 1 further comprising brake means carried by said carriage means for retarding the movement of said carriage means along said channel under the force of said spring means.

5. The dispensing machine of claim 4 further comprising a movable brake plunger carried by said carriage means and resilient means biasing said plunger into frictional engagement with a path extending along said channel to retard the movement of said carriage means under the force of said spring means.

6. The dispensing machine of claim 5 further comprising latch means disposed on said path for engaging said brake plunger and thereby latching said carriage means against the force of said spring means in a position spaced from said releasing means.

7. The dispensing machine of claim 6 further comprising a handle attached to said brake plunger whereby said brake plunger can be raised against the force of said resilient means to disengage said plunger from said latch means.

8. The dispensing machine of claim 6 wherein said spring, when uncoiled, is disposed along the longitudinal center of said channel, said brake plunger being vertically disposed and frictionally engaging said channel along the longitudinal center thereof.

9. A dispensing machine comprising:

a frame forming at least one substantially horizontal trough along which articles to be dispensed can be arranged in a row, said trough having a flat floor, two sidewalls, and an open top that permits insertion of said articles therein;

releasing means disposed at one end of said trough for releasing said articles sequentially upon actuation thereof;

a movable carriage disposed within said trough;

an elongated metal tape having first and second ends, said first end being attached to said carriage and said second end being attached to said trough floor near the end thereof adjacent said releasing means, said tape forming a spring which coils resiliently about said first end when unrestrained, thereby biasing said carriage toward said releasing means to feed said articles along said trough toward said releasing means; and said tape being concave in cross section and oriented so that the longitudinal center axis of any uncoiled portion thereof rests on said trough floor and is substantially centered between said sidewalls, the longitudinal edges of said tape standing away from said floor whereby said articles to be dispensed rest on said edges.

10. The dispensing machine of claim 9 further comprising elongated guides disposed along said sidewalls and slidably engaged by said carriage.

11. The dispensing machine of claim 9 further comprising latch means for latching said carriage against the bias of said tape spring at a position spaced from said releasing means to permit loading of said articles to be dispensed between said carriage and said releasing means.

12. A dispensing machine comprising:

a frame forming at least one substantially horizontal trough along which articles to be dispensed can be arranged in a row, said trough having a flat floor, two sidewalls, and an open top that permits insertion of said articles therein;

releasing means disposed at one end of said trough for releasing said articles sequentially upon actuation thereof;

a movable carriage disposed within said trough;

an elongated tape having first and second ends, said first end being attached to said carriage and said second end being attached to said trough floor near the end thereof adjacent said releasing means, said tape forming a spring which coils resiliently about said first end when unrestrained, thereby biasing said carriage toward said releasing means to feed said articles along said trough toward said releasing means; and brake means carried by said carriage for frictionally retarding the movement of said carriage along said trough under the force of said spring.

13. A dispensing machine comprising:

a frame forming at least one substantially horizontal trough along which articles to be dispensed can be arranged in a row, said trough having a flat floor, two sidewalls, and an open top that permits insertion of said articles therein;

releasing means disposed at one end of said trough for releasing said articles sequentially upon actuation thereof;

a movable carriage disposed within said trough;

an elongated tape having first and seconds ends, said first end being attached to said carriage and said second end being attached to said trough floor near the end thereof adjacent said releasing means, said tape forming a spring which coils resiliently about said first end when unrestrained, thereby biasing said carriage toward said releasing means to feed said articles along said trough toward said releasing means; and a movable brake plunger carried by said carriage and resilient means biasing said plunger into frictional engagement with a path extending along said floor to retard the movement of said carriage under the force of said spring.

14. A dispensing machine comprising:

a cabinet;

a plurality of drawers movable between an operating position within said cabinet and a loading position projecting from said cabinet, each drawer including a plurality of parallel substantially horizontal troughs in which articles to be dispensed can be arranged in a row, and each trough having a floor, sidewalls and an open top;

a plurality of releasing means disposed at the front ends of said troughs for releasing said articles sequentially;

a plurality of carriages each movably disposed within one of said troughs;

a plurality of elongated resilient metal tape springs having each first and second ends and being predisposed to form a coil about said first end, each of said tape springs being attached at said first end to one of said carriages and at said second end to said floor of said trough in which said carriage is disposed, whereby said carriages are urged toward said releasing means by said tape springs and said articles are thereby fed to said releasing means; and said tape springs being concave in cross section and oriented so that the longitudinal center axes thereof rest on said trough floors substantially centered between said trough sidewalls, the longitudinal edges of said tape springs standing away from said floors whereby said articles to be disposed rest on said edges.

15. A dispensing machine comprising:

a cabinet;

a plurality of drawers movable between an operating position within said cabinet and a loading position projecting from said cabinet, each drawer including a plurality of parallel, substantially horizontal troughs in which articles to be dispensed can be arranged in a row, and each trough having a floor, sidewalls and an open top;

a plurality of releasing means disposed at the front ends of said troughs for frictionally releasing said articles sequentially;

a plurality of carriages each movably disposed within one of said troughs;

a plurality of spring means for urging said carriages toward said releasing means, each of said spring means comprising an elongated tape spring; and a plurality of brake means carried by said carriages for retarding the movement of said carriages along said troughs under the force of said spring means.

16. The dispensing machine of claim 15 wherein said tape spring is metal, concave in cross section and predisposed to form a coil.

17. A dispensing machine comprising:

a cabinet;

a plurality of drawers movable between an operating position within said cabinet and a loading position projecting from said cabinet, each drawer including a plurality of parallel, substantially horizontal troughs in which articles to be dispensed can be arranged in a row, and each trough having a floor, sidewalls and an open top;

a plurality of releasing means disposed at the front ends of said troughs for releasing said articles sequentially;

a plurality of carriages each movably disposed within one of said troughs;

a plurality of elongated resilient tape springs each having first and second ends and being predisposed to form a coil about said first end, each of said tape springs being attached at said first end to one of said carriages and at said second end to said floor of the trough in which said carriage is disposed, whereby said carriages are urged toward said releasing means by said tape springs and said articles are thereby fed to said releasing means; and a plurality of brake means carried by said carriages for frictionally retarding the movement of said carriages along said troughs under the force of said tape springs.

18. A dispensing machine comprising:

a cabinet;

a plurality of drawers movable between an operating position within said cabinet and a loading position projecting from said cabinet, each drawer including a plurality of parallel substantially horizontal troughs in which articles to be dispensed can be arranged in a row, and each trough having a floor, sidewalls and an open top;

a plurality of releasing means disposed at the front ends of said troughs for releasing said articles sequentially, said releasing means including a trapdoor pivotably attached to said trough floor and movable between a closed position in which it forms an extension of said trough floor to retain said articles and an open position in which it projects downwardly from said floor to dispense said articles, an ejection member extending across said trough to engage one of said articles from the top, removable side pieces of a height selected to accommodate said articles connecting said door to said ejection member, and vertical side members having grooves in which said side pieces are disposed, each of said side members being formed by two vertically telescoping members, whereby the height of said releasing means is adjustable;

a plurality of carriages each movably disposed within one of said troughs; and a plurality of elongated resilient tape springs having each first and second ends and being predisposed to form a coil about said first end, each of said tape springs being attached at said first end to one of said carriages and at said second end to said floor of the trough in which said carriage is disposed;

whereby said carriages are urged toward said releasing means by said tape springs and said articles are thereby fed to said releasing means.

19. A dispensing machine comprising:

a cabinet;

a plurality of drawers movable between an operating position within said cabinet and a loading position projecting from said cabinet, each drawer including a plurality of parallel substantially horizontal troughs in which articles to be dispensed can be arranged in a row, and each trough having a floor and sidewalls;

a plurality of releasing means for releasing said articles sequentially attached to the front ends of said troughs and supported by said drawers;

a plurality of carriages each movably disposed within one of said troughs;

a plurality of spring means for urging said carriages toward said releasing means, each of said spring means comprising an elongated resilient tape spring;

a plurality of latching means for latching said carriages, against the force of said spring means, at the ends of said troughs away from said releasing means to permit loading of said articles to be dispensed between said carriages and said releasing means; and a plurality of unlatching means for operating said latching means when said drawers are in said operating position to permit said carriages to move toward said releasing means, each of said unlatching means comprising a finger supported by said cabinet and having a surface that is engageable with said latching means upon movement of said drawer.

20. The dispensing means of claim 19 wherein said latching means includes a plunger and an aperture in said trough arranged for engagement by said plunger.

21. The dispensing mechanism of claim 20 wherein said unlatching means comprises a plurality of stationary fingers supported by said cabinet.

22. The dispensing mechanism of claim 19 wherein said unlatching means comprises a plurality of stationary fingers supported by said cabinet.

23. A dispensing machine comprising:

a cabinet;

a plurality of drawers movable between an operating position within said cabinet and a loading position projecting from said cabinet, each drawer including a plurality of parallel substantially horizontal troughs in which articles to be dispensed can be arranged in a row, and each trough having a floor, sidewalls and an open top;

a plurality of releasing means disposed at the front ends of said troughs and supported on said drawers for releasing said articles sequentially;

a plurality of carriages each movably disposed within one of said troughs;

a plurality of elongated resilient tape springs each having first and second ends and being predisposed to form a coil about said first end, each of said tape springs being attached at said first end to one of said carriages and at said second end to said floor of the trough in which said carriage is disposed, whereby said carriages are urged toward said releasing means by said tape springs and said articles are thereby fed to said releasing means;

a plurality of latching means for latching said carriages against the force of said spring means at the ends of said troughs away from said releasing means to permit loading of said articles to be dispensed between said carriage and said releasing means; and a plurality of unlatching means for operating said latching means when said drawers are in said operating positions to permit said carriages to move toward said releasing means.

24. The dispensing means of claim 23 wherein said latching means includes a plunger and an aperture in said trough arranged for engagement by said plunger.

25. The dispensing mechanism of claim 24 wherein said unlatching means comprises a plurality of stationary fingers supported by said cabinet.

26. A dispensing machine comprising:

a frame forming at least one substantially horizontal trough along which articles to be dispensed can be arranged in a row, said trough having a floor and sidewalls;

releasing means disposed at one end of said trough for releasing said articles sequentially upon actuation thereof;

a movable carriage disposed within said trough;

spring means for urging said carriage toward said releasing means, said spring means comprising an elongated tape spring; and a movable brake plunger carried by said carriage and resilient means biasing said plunger into frictional engagement with said trough to retard the movement of said carriage under the force of said spring means.

27. The dispensing machine of claim 14, wherein said tape springs, when uncoiled, are disposed along the longitudinal centers of said trough floors.

28. The dispensing machine of claim 14 further comprising a plurality of latch means for latching said carriages against the force of said tape springs in positions spaced from said releasing means to permit loading of said articles to be dispensed between said carriages and said releasing means.

29. The dispensing machine of claim 15, wherein each of said brake means comprises a movable brake plunger carried by said carriage and resilient means for biasing said plunger to frictionally engage a path extending along said floor of one of said troughs to retard the movement of said carriage.

* * * * *